Aug. 8, 1950 — H. C. BRUMBAUGH — 2,518,278
COLLAPSIBLE TRAILER

Filed Sept. 20, 1947 — 4 Sheets-Sheet 1

INVENTOR.
Harold C. Brumbaugh
BY
Attorney

Aug. 8, 1950  H. C. BRUMBAUGH  2,518,278
COLLAPSIBLE TRAILER
Filed Sept. 20, 1947  4 Sheets-Sheet 2

INVENTOR.
Harold C. Brumbaugh
BY
Attorney

Aug. 8, 1950     H. C. BRUMBAUGH     2,518,278
COLLAPSIBLE TRAILER

Filed Sept. 20, 1947     4 Sheets-Sheet 3

INVENTOR.
Harold C. Brumbaugh
BY
Attorney

Aug. 8, 1950     H. C. BRUMBAUGH     2,518,278
COLLAPSIBLE TRAILER

Filed Sept. 20, 1947     4 Sheets-Sheet 4

INVENTOR.
Harold C. Brumbaugh
BY
Attorney

Patented Aug. 8, 1950

2,518,278

UNITED STATES PATENT OFFICE 2,518,278

COLLAPSIBLE TRAILER

Harold C. Brumbaugh, Portland, Oreg., assignor of one-third to Max E. Krueger, and one-third to Herbert Heltzel, both of Portland, Oreg.

Application September 20, 1947, Serial No. 775,327

17 Claims. (Cl. 296—23)

The present application is an improvement upon the structure disclosed and claimed in my co-pending application, Serial No. 662,284, filed April 15, 1946, and now Patent No. 2,483,332, granted September 27, 1949.

In the aforesaid application a collapsible trailer comprising a body structure and a roof structure is provided with inwardly collapsible walls, the walls and roof structure being raised or lowered by a mechanism mounted within the body structure. The principal object of the present invention is to simplify the construction and lessen the cost thereof by providing a collapsible trailer with counterpoise means for the collapsible portions whereby one person may raise or lower the same. The present invention is designed to permit the operation of a collapsible trailer by persons of slight build or strength, in order that women and children may enjoy the benefits of a collapsible house trailer.

A further object of the present invention is to provide a collapsible trailer with means for preventing side sway of the side walls and roof while the trailer is being opened or collapsed. In prior art devices of a similar nature, and in experimental models which I have built and operated, it is a source of great danger that the elevated structure may collapse upon itself after being partially opened or may collapse toward one side, thus wrecking the construction and endangering the operator thereof. An object of the present invention is to provide a collapsible trailer which may be opened or closed by one person without the slightest danger to thhe construction or to the operator thereof.

A further object of the present invention is to provide a collapsible trailer which may be opened by one person operating upon one end thereof as the first movement to elevate the roof and walls to a partially elevated position, in which position the elevated structure will remain, whereupon the operator may complete the opening or closing movement by manipulating the opposite end of the construction. In connection with the foregoing an object of the present invention is to provide the construction with counterpoise springs of such strength and so arranged that the end first manipulated will remain in partially elevated position until the opposite end is manipulated, and thereupon the counterpoise springs will complete the raising operation of the entire structure.

A further object of the present invention is to provide a collapsible trailer with counterpoise springs and other devices so arranged that collapsing movement of the trailer may be accomplished by manipulating one end thereof, the other devices herein mentioned being of such character as to cushion the collapsing of the trailer and prevent damage thereto or to the operator.

The foregoing and other objects and advantages of the present invention will be more readily apparent from an inspection of the accompanying drawings taken in connection with the following specification, wherein like numerals refer to like parts throughout, while the features of novelty will be more distinctly pointed out in the appended claims.

In the drawings

Figure 7:
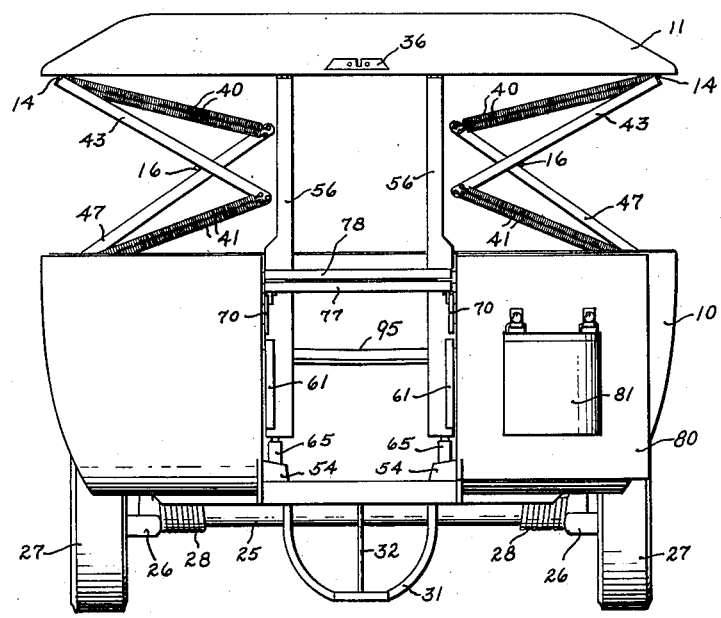
Fig. 7 is an end view of the rear end of the trailer showing the extent to which the roof structure must be manually elevated before the counterpoise springs complete the elevation thereof.

The trailer of the present invention comprises a body structure 10 and a roof structure 11, the two structures being joined by collapsible side walls, each including an upper wall section 12 and a lower wall section 13, the upper wall section being hinged to the roof structure as by means of hinges 14, the lower wall section being hinged to the body structure as by means of hinges 15, and the two sections being hinged together as by means of hinges 16. The wall sections are adapted to fold inwardly along the line of hinges 16 and extend inwardly substantially co-equally with side benches or tables 17 between which an aisle remains as seen in Fig. 7. The side benches 17 preferably are formed to encase collapsible bunks as more clearly set forth and claimed in my copending application, Serial No. 720,731, filed January 8, 1947, or if desired may merely provide benches enclosing spaces in which camping equipment may be stored.

Figure 4:
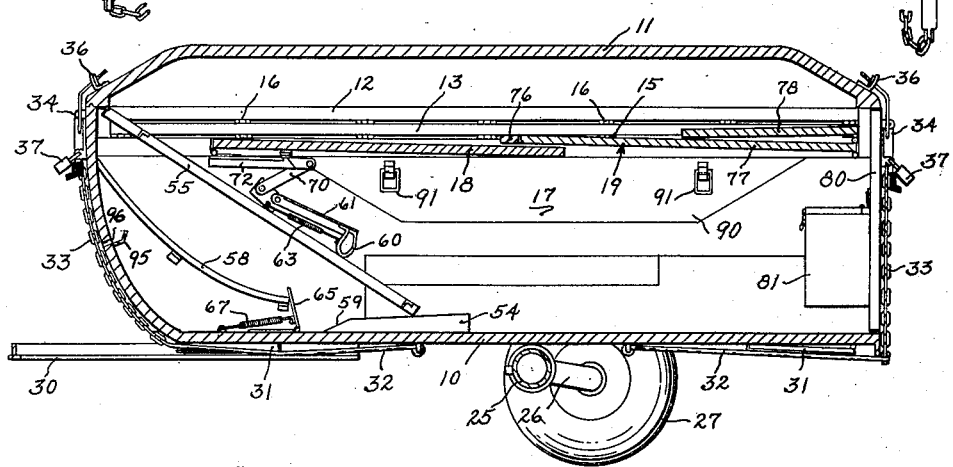
Fig. 4 is a vertical section taken substantially along line 4—4 of Fig. 2.

The body section 10 is preferably provided with low walls forming sides, front and at least a part of the rear of the enclosure, the side walls being completed by the collapsible sections 12 and 13 and the end walls being completed by front end wall 18 and rear end wall 19 which are adapted to be folded inwardly beneath the inwardly collapsing side walls as seen in Fig. 4. The roof structure 11 is of such size and shape as to form a lid for the body structure when lowered into contact therewith, the rim of the body structure preferably being provided with a tongue 20 adapted to fit a peripheral groove 21 in the edge of the roof structure to form a tight enclosure when the vehicle is in movement so as to prohibit the entry of dust and water.

The body structure may be mounted upon a single axle 25 having rearwardly projecting arms 26 upon which are mounted a pair of wheels 27, the arms 26 being free to swing and take up road shocks as permitted by the coil springs 28. Although this type of axle and spring is preferable since vertical movement of both wheels is coextensive, thus eliminating side sway of the vehicle when traveling, other forms of wheel and axle suspension may be substituted therefor without departing from my invention. The vehicle is adapted to be attached to a towing vehicle through suitable means such as the A-frame bars 30 herein indicated. When the vehicle is at rest it is supported by the wheels 27 and a pair of brackets 31 hinged at front and rear of the vehicle and adapted to be braced in vertical position by hinged braces 32. When the vehicle is to be moved the brackets 31 are swung inwardly against the bottom of the trailer and maintained in that position by drawing the braces 32 upward. The braces 32 are maintained in elevated position by chains 33 terminating in toggle clamp devices 34, each including a bayonet catch having a pair of prongs 35 adapted to slip into openings in a bracket 36 mounted at the end of the roof structure. When the toggle clamp arms are jackknifed as seen in Fig. 4 they may be latched in holding position by a suitable latch such as the barrel lock 37 indicated in Fig. 4. When the arms of the toggle clamp are jackknifed the roof is drawn firmly against the rim of the body to prevent dust stirred up by the towing vehicle from entering the trailer. Other forms of supporting legs and other forms of means to hold the lid tightly against the body structure may be substituted without departing from my invention.

Figures 5, 6:
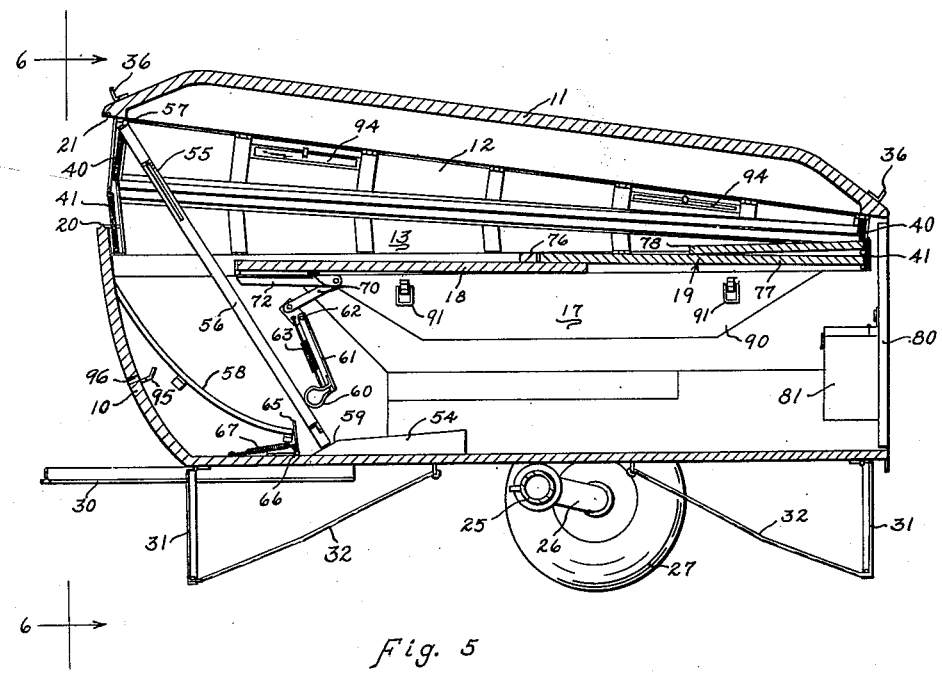
Fig. 5 is a view similar to Fig. 4 showing the trailer after the first manipulation, with one end of the collapsible construction held in partially elevated position.
Fig. 6 is an end view taken from the plane indicated by the line 6—6 of Fig. 5.
Figure 8:
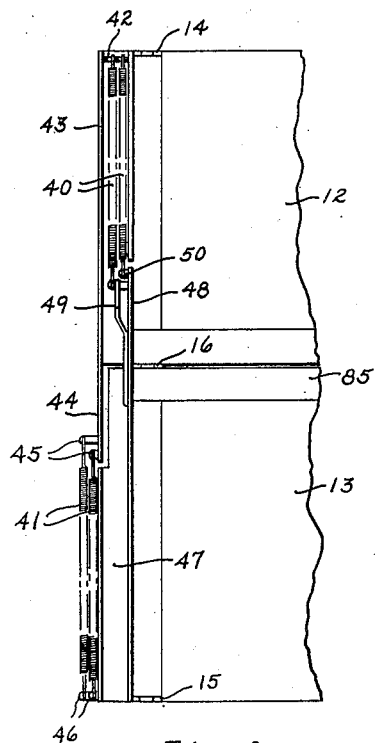
Fig. 8 is a partial section taken substantially along line 8—8 of Fig. 1.
Figure 9:
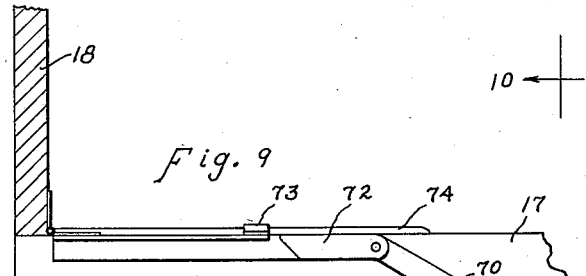
Fig. 9 is a partial view in side elevation of a portion of the front end wall supporting means.
Figure 10:
Fig. 10 is an end view thereof taken from the plane of line 10—10 of Fig. 9.

In the present invention the elevation of the collapsible portions is achieved in part by the use of pairs of counterpoise springs, each pair comprising an upper spring 40 associated with the upper side wall section 12 and a lower spring 41 associated with the lower side wall section 13. As herein illustrated a pair of springs 40 and a pair of springs 41 may be utilized, but it should be obvious that a single spring of proper effect may be substituted for the double springs, and as referred to herein the pair of springs means at least one spring 40 and at least one spring 41 although any other number of springs may be provided in place of the single springs. The upper springs 40 are attached at their upper ends to a rod 42 extending between the flanges of a channel member 43 fastened to the end of the wall section 12 and having a portion thereof extending beyond the hinge line to provide a counterpoise lever 44 supporting a pair of pins 45 to which the upper ends of the springs 41 are attached. The lower ends of the springs 41 are attached to pins 46 projecting outwardly from a channel member 47 fastened to the end of wall section 13 and having a portion extending beyond the hinges 16 to provide a counterpoise lever 48. The lever 48 is supplemented by a stiffening piece 49 welded thereto and the two members support pins 50 to which are attached the lower ends of the springs 40. Thus each side wall comprises a pair of collapsible sections, a counterpoise lever extending beyond the hinge line joining the sections, and a counterpoise spring extending from a point adjacent the hinges attaching the section to the rest of the structure to the end of the counterpoise lever fastened to the opposite side wall section. As seen in Figs. 6 and 7 the springs have been stretched to a considerable extent from the positions occupied in Figs. 1 and 8. When the walls are elevated the springs are of a length equal to the height of a side wall section less the length of a counterpoise lever, and when the walls are collapsed the springs are stretched to a length equal to the height of a side wall section plus the length of a counterpoise lever. When the structure is fully collapsed the springs lie almost in line with the side wall sections to which they are attached, hence can exert very little force tending to open the trailer. However, when the side walls are partially opened, as seen in Fig. 6 the force of each spring is exerted through a moment arm proportional to the sine of the angle between the side wall sections. At the position illustrated in Figs. 5 and 6 this force is almost sufficient to hold the roof and side wall structure in partially elevated position and with very little encouragement the springs exert sufficient force to complete the elevation of the roof and side walls.

Figure 3:
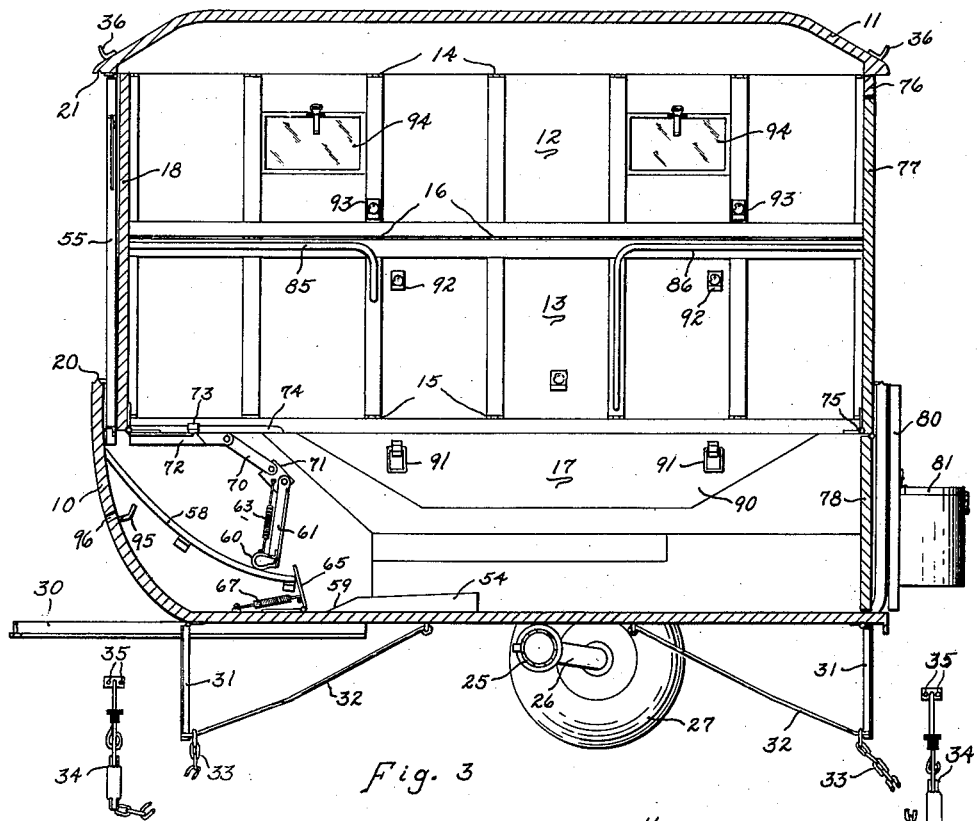
Fig. 3 is a vertical section taken substantially along line 3—3 of Fig. 1.

In order to hold the roof and side wall construction in partially elevated position as seen in Figs. 5 and 6 I provide a standard 55 comprising a pair of upright legs 56 so formed and spaced as to fit between the side benches 17 with a slight clearance on either side. The standard is hinged to the forward end of the roof 11 by hinges 57 and the lower end thereof would swing freely were it not constrained by guiding means including a pair of curved tracks 58 mounted at the forward end of each bench 17 and extending rearwardly into the aisle from a point adjacent the front of the body structure. The tracks 58 engage and guide the lower ends of the uprights 56. The tracks 58 terminate short of extensions thereof extending along the floor of the body structure, there being thus provided breaks in the track forming abutments 59 facing upwardly and forwardly. Each upright 56 is engaged by a rounded strap 60 mounted upon the lower end of a lever 61 pivoted at 62 to the side of the bench 17 and pulled forwardly by a spring 63 tensioned between a fixed point and a portion of the strap 60. The strap 60 and spring 63 thus provide a spring-urged pusher tending to hold the bottom ends of the uprights 56 in engagement with the surface of the tracks. When the operator raises the front end of the roof to the position seen in Fig. 5 the lower ends of the uprights 56 will engage the abutments 59 to maintain the roof structure in the partially elevated position. At this position the benches 17 prevent excessive lateral movement of the standard and therefore the roof structure is prevented from sideslipping in either direction. The operator may now engage the rear end of the roof structure and push upwardly thereon to raise that end until the counterpoise springs exert sufficient force to complete the raising movement. Since the entire structure is hinged together, when the rear portion has been raised to a certain extent the front portion will tend to follow and the counterpoise springs associated therewith will complete the raising of the front end to cause the standard to assume a substantially vertical position as seen in Fig. 3. The pushers 60 swing forwardly until stopped and retained in the position shown in Fig. 3 by engagement with the track section 58.

On the reverse movement the operator standing at the rear of the trailer may pull inwardly on the side wall sections adjacent the line of hinges 16, thus causing downward movement of the entire roof. The standard 55 will be caused to swing inwardly by the tracks 58. When the lower ends of the uprights 56 engage the pushers 60 a cushioning effect is provided since the springs 63 must be tensioned, and the final extent of the collapsing of the trailer will be delayed by the operator holding back on the rear end of the roof and the springs 63 holding back against the front end of the roof. In order that the standard may by-pass the abutments 59, a jumper device is provided comprising a flap 65 at each lower end of the tracks 58, hinged to the floor at 66, and normally maintained in upright position by a spring 67 tensioned between an intermediate portion of the flap 65 and a forward portion of the floor. The uprights 56 engage these flaps and force them rearwardly, the flaps being so placed as to provide bridges across the abutments 59, thus guiding the uprights onto the track extensions and permitting complete collapse of the trailer. In the upward movement the standard is lifted over the ends of the flaps 65.

In order to complete the enclosure the front wall 18 is hinged to the body structure through a jointed support including a link 70 hinged to the bench 17 at 71 and a link 72 hinged to the link 70 and to the lower end of the wall 18, there being one such support at each side of the aisle. The wall is of sufficient width to extend entirely between the side wall sections when elevated. An intermediate portion of link 72 supports a hook 73 adapted to engage the upper surface of a rail 74 fastened to the edge of bench 17, the hooks 73 providing means to support the end wall 18 at the proper elevation when the links are extended to move the wall outwardly as seen in Fig. 3. The upper corners of the wall 18 may be fastened either to the roof structure or the side walls by suitable latches (not shown). When it is desired to close the trailer the end wall 18 is bodily shifted inward to the position illustrated in Fig. 4 as permitted by jackknifing the links 70 and 72, the wall being supported in proper position since it is wider than the aisle between the benches 17.

The rear end wall 19 comprises a section wide enough to bridge the entire space between the collapsible side walls, which is hinged to the top of the benches 17 by hinges 75, the upper end thereof being retainable by suitable latches mounted on the roof or side walls (not shown). The end wall 19 is preferably in the shape of a frame including a cross bar 76 so that the central portion thereof may provide a hinged door 77, to the lower portion of which is hinged a door flap 78 which will extend between the rear ends of the benches 17 and be suitably latched to the upper portion when the trailer is opened. There is thus provided a full height door which may be opened and closed to permit occupancy of the trailer when extended. When the trailer is collapsed as seen in Fig. 4 the rear wall is folded down over the end of the front wall 18 and the door flap 78 folded over onto the upper section between the hinges 16 of the collapsed side walls.

In order to provide a complete enclosure for the collapsed trailer I provide an access door 80 hinged to a vertical edge of a gap in the rim of the body portion, this door 80 not being provided with tongues for reception in grooves in the roof in order that the door may be opened and closed when the trailer is collapsed. The inner surface of the door may support a cabinet, ice chest or other similar structure 81 which will project into the aisle when the trailer is completely closed as seen in Fig. 4, but which will be accessible from the outside when the door 80 is opened as seen in Fig. 7. The door 80 may be opened and closed without raising and lowering the elevated portions in order that loose duffle may be stowed in the space between the benches 17.

Figure 1:
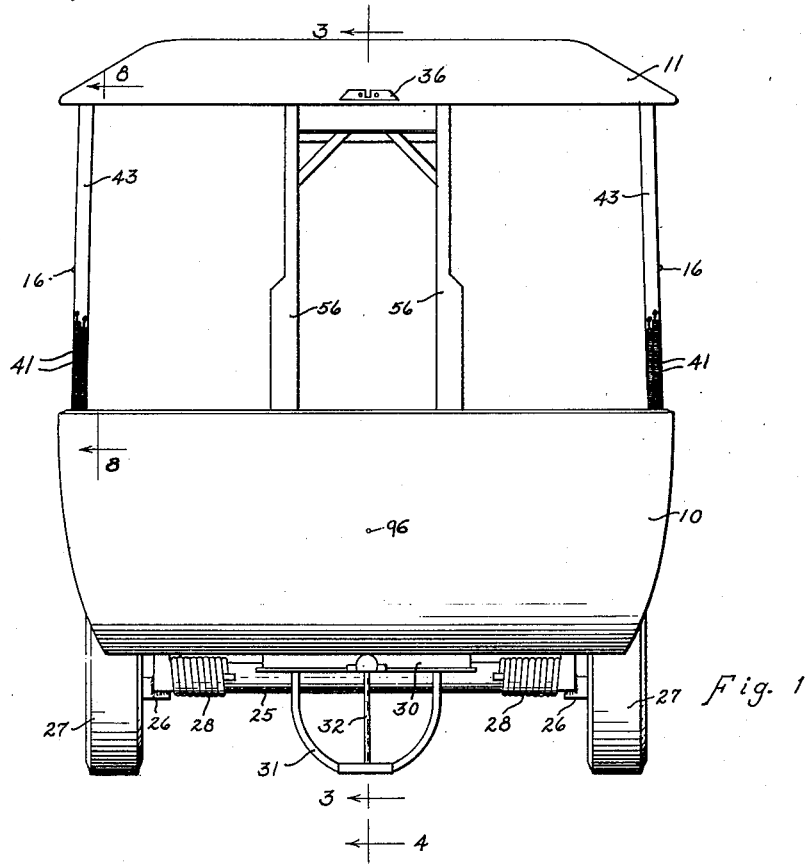
Fig. 1 is a front elevation of a trailer embodying the present invention when in opened condition.
Figure 2:
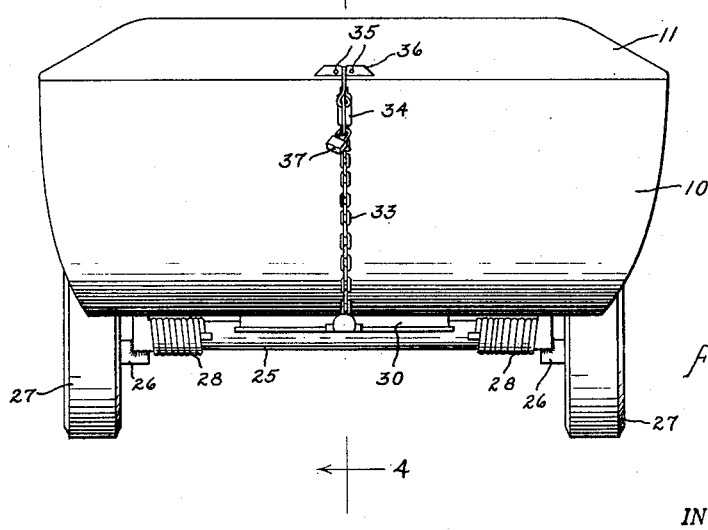
Fig. 2 is a front elevation of the trailer in collapsed condition.

An important feature is illustrated in Fig. 1 wherein it will be seen that the section 12 is hinged to the roof 11 inwardly of a vertical plane through the hinges connecting section 13 to the body 10, causing the side walls to slope inwardly toward the top when the walls are upright, and that the end walls are in the shape of isosceles trapezoids with the bases thereof disposed downwardly. This means that the side edges of the end walls fit snugly when the walls are upright, but when they are being moved from or to their elevated positions clearance is provided between the edges of the end walls and the inner surfaces of the side walls or projections thereon. The lower sections 13 of the side walls may support rails 85 and 86 (Fig. 3) to guide the front and rear end walls and prevent them from scraping the inner surfaces of the side walls.

The benches 17 preferably comprise hinged tops including downwardly projecting front portions 90 on which are mounted handles 91 adapted to engage in hook devices 92 mounted on the side walls to hold the lids in elevated position so that access to the interior thereof may be achieved. As set forth in the aforementioned application, Serial No. 720,731, collapsible bunks may be mounted within the benches and may be elevated and held in position for occupancy by suitable means including hook devices 93 mounted on the side walls. The side walls are preferably provided with suitable windows 94. Cooking and other equipment may be mounted in the forward end of the aisle, such means forming no part of the present application.

Suitable troughs may be formed in the body portion, such as the trough 95, and drain openings, such as openings 96, may be provided to prevent rain from entering the trailer when the roof is extended.

Having illustrated and described a preferred embodiment of my invention it should be apparent to those skilled in the art that modifications in arrangement and detail thereof are readily conceivable. All such modifications as come within the true spirit and scope of the appended claims are considered to be a part of my invention.

I claim:

1. A collapsible trailer comprising a body structure, a roof structure having such shape and size as to form a lid engaging the sides of said body structure when lowered into engagement therewith, inwardly folding, collapsible side walls, and counterpoise springs associated with said side walls in such manner as to be placed under increasing tension as said side walls fold inwardly, each of said side walls comprising a pair of longitudinally hinged sections and counterpoise levers extending from each section beyond its junction with the other section, and said springs comprising several pairs of springs, each pair including an upper spring stretched between said roof structure and the free end of a counterpoise lever extending from the lower side wall section and a lower spring stretched between said body structure and the free end of a counterpoise lever extending from the upper side wall section.

2. A collapsible trailer comprising a body structure, a roof structure having such shape and size as to form a lid engaging the sides of said body structure when lowered into engagement therewith, inwardly folding, collapsible side walls, and counterpoise springs associated with said side walls in such manner as to be placed under increasing tension as said side walls fold inwardly, each of said side walls comprising a pair of longitudinally hinged sections each having a counterpoise lever extending therefrom at each end thereof, and said springs comprising a pair of springs at each end of each wall, each pair of springs comprising one spring extending from a point adjacent the body structure to the free end of a counterpoise lever extending from the upper side wall section and a second spring extending from a point adjacent the roof structure to the free end of a counterpoise lever extending from the lower side wall section.

3. A collapsible trailer comprising a body structure, a roof structure having such shape and size as to form a lid engaging the sides of said body structure when lowered into engagement therewith, inwardly folding, collapsible side walls, and counterpoise springs associated with said side walls in such manner as to be placed under increasing tension as said side walls fold inwardly, said springs being of such strength and so tensioned as to be capable of raising said roof structure when said side walls have been partially raised; in combination with a standard swinging from one end of said roof structure, and a curved track arranged in said body structure to guide the free end of said standard into said body structure as said roof structure is raised or lowered, said track having a break therein forming an abutment adapted to engage said standard for supporting said one end of the roof structure in partially raised position until said roof structure is entirely raised by the combined effect of manually raising the opposite end thereof and the force of said springs.

4. A collapsible trailer comprising a body structure, a roof structure having such shape and size as to form a lid engaging the sides of said body structure when lowered into engagement therewith, inwardly folding, collapsible side walls, and counterpoise springs associated with said side walls in such manner as to be placed under increasing tension as said side walls fold inwardly; in combination with a freely swinging standard hinged to one end of said roof structure, an inwardly directed track arranged in said body structure to engage the free end of said standard as said roof structure is raised or lowered and swing said standard into said body structure, said track having a break therein forming an abutment adapted to engage the free end of said standard for supporting said one end of the roof structure in partially raised position until said roof structure is entirely raised by the combined effect of manually raising the opposite end thereof and the force of said springs, and a jumper device engageable by the free end of said standard upon collapsing movement of said roof structure to cause the free end of said standard to pass over said abutment.

5. A collapsible trailer comprising a body portion, a roof portion adapted to be lowered onto said body portion, a standard hinged to one end of said roof portion, a curved track extending into said body portion and guiding the free end of said standard, and side structures in said body portion closely embracing said standard to prevent sideslip of said roof portion when in partially elevated position.

6. A collapsible trailer comprising a body portion, a roof portion adapted to be lowered onto said body portion, a standard hinged at one end to one of said portions, a curved track guiding the free end of said standard to swing inwardly when lowered, an end wall collapsibly mounted on one of said portions, and a joined support for the mounting of said end wall permitting bodily shifting of said end wall when collapsed in order to permit inward swinging of said standard.

7. A collapsible trailer comprising a body portion, a roof portion adapted to be lowered onto said body portion, an end wall collapsibly mounted on said body portion, and a jointed support for the lower end of said end wall permitting bodily shifting of said end wall when collapsed, said support comprising a first link pivoted to said end wall and a second link pivoted to said body portion, said links being pivotally connected together and movable to an extended position when the end wall is shifted outwardly and to a jackknifed position when the wall is shifted inwardly.

8. A collapsible trailer comprising a body portion, a roof portion adapted to be manually raised from or lowered onto said body portion, a standard hinged to one end of said roof portion, and a curved track extending into said body portion and guiding the free end of said standard, said track having a break therein forming an abutment adapted to engage said standard for supporting said one end of the roof structure in partially raised position until said roof structure is entirely raised by manipulation of the opposite end thereof.

9. A collapsible trailer comprising a body portion, a roof portion adapted to be lowered onto said body portion, a standard hinged to one end of said roof portion, a curved track extending into said body portion and guiding the free end of said standard, said track having a break therein forming an abutment adapted to engage said standard for supporting said one end of the roof structure in partially raised position until said roof structure is entirely raised by manually raising the opposite end thereof, and a spring-urged flap engageable by said standard upon downward movement thereof and movable thereby to bridge said break.

10. A collapsible trailer comprising side walls, each of said side walls comprising a pair of longitudinally hinged sections each having a pair of counterpoise levers extending therefrom in line therewith at the edge joining the sections together, one at each end thereof, and a pair of springs at each end of each wall, each pair of springs comprising one spring extending from the bottom of the lower side wall section to the free end of a counterpoise lever extending from the upper side wall section and a second spring extending from the top of the upper side wall section to the free end of a counterpoise lever extending from the lower side wall section.

11. The construction set forth in claim 10 wherein said springs are of such strength and so tensioned as to be capable of raising said side walls when said side walls have been partially unfolded.

12. A collapsible trailer comprising a body portion and a roof portion adapted to form a lid for said body portion, a collapsible support hingedly mounted beneath each end of said body portion, a chain connected to each of said supports, means for removably attaching the free end of each chain to the adjacent end of said roof portion when lowered, and a toggle clamp device forming a portion of each chain and comprising arms which may be jackknifed when said chains are attached to said roof portion to draw the roof portion firmly against said body portion.

13. A collapsible trailer comprising upper and lower separable sections, and counterpoise means to aid in raising and lowering one of said sections with respect to the other comprising a pair of levers hinged to said sections and to each other, each lever having a free end extending beyond the junction of said levers, and a pair of springs, each spring extending from one of said sections to the extended free end of the lever hinged to the other section.

14. A collapsible trailer comprising generally rectangular upper and lower separable sections, and a plurality of counterpoise means to aid in raising and lowering one of said sections with respect to the other, each counterpoise means comprising a pair of levers hinged to the superimposed corners of said sections and to each other, each lever having a free end extending beyond the junction of a pair of said levers, and a pair of springs, each spring extending from one of said sections to the extended free end of the lever hinged to the other section.

15. A collapsible trailer including floor and overhead sections and a counterpoise for assisting in raising the overhead section thereof comprising a pair of levers each hinged to one of said sections and to the other lever in scissors fashion to provide freely projecting ends, and a pair of springs each tensioned between the freely projecting end of one of said levers and to the section of said trailer to which the other of said levers is hinged.

16. A collapsible trailer comprising a lower portion, an upper portion adapted to be raised or lowered with respect to said lower portion, a lever hinged to one of said portions, a second lever hinged to the other of said portions, said levers being hinged together in such fashion that at least one of said levers projects beyond the junction of said levers, and a spring tensioned between the projecting end of said one lever and a point adjacent the junction of the other of said levers with the trailer portion to which it is attached.

17. A collapsible trailer comprising a body structure including a floor and low walls forming a rim, a roof structure of such outline as to rest upon the rim of said body structure when lowered, inwardly folding side walls comprising lower sections hinged to said body structure and upper sections hinged to said roof structure, and inwardly folding end walls hingedly mounted on said body structure so as to be capable of swinging movement from stowed positions beneath the roof structure when lowered to upright positions between the ends of the side walls when raised, said end walls having their side edges sloping inwardly from bottom to top and said inwardly folding side walls sloping upwardly toward each other from bottom to top when upright, the side edges of said end walls contacting the inner surfaces of the ends of said side walls when upright whereby to form a complete enclosure together with said roof structure and body structure, the sloping side edges of said end walls permitting said end walls to swing between said side walls while being raised and lowered and to clear the surfaces of said side walls when doing so.

HAROLD C. BRUMBAUGH.

REFERENCES CITED

The following references are of record in the file of this patent:

UNITED STATES PATENTS

| Number | Name | Date |
|---|---|---|
| 1,386,943 | Moore | Aug. 9, 1921 |
| 1,863,206 | Quinn | June 14, 1932 |
| 1,917,824 | Burns | July 11, 1933 |
| 2,182,967 | Kors | Dec. 12, 1939 |
| 2,483,332 | Brumbaugh | Sept. 27, 1949 |

FOREIGN PATENTS

| Number | Country | Date |
|---|---|---|
| 100,293 | Australia | Feb. 12, 1937 |
| 278,879 | Great Britain | Oct. 20, 1927 |
| 311,089 | Great Britain | May 9, 1929 |

Certificate of Correction

Patent No. 2,518,278                                                August 8, 1950

HAROLD C. BRUMBAUGH

It is hereby certified that error appears in the printed specification of the above numbered patent requiring correction as follows:

Column 8, line 30, for the word "joined" read *jointed*;

and that the said Letters Patent should be read as corrected above, so that the same may conform to the record of the case in the Patent Office.

Signed and sealed this 24th day of October, A. D. 1950

[SEAL]

THOMAS F. MURPHY,
*Assistant Commissioner of Patents.*